US011124241B2

(12) United States Patent
Swayne et al.

(10) Patent No.: US 11,124,241 B2
(45) Date of Patent: Sep. 21, 2021

(54) PANORAMIC ROOF STIFFENER REINFORCEMENT

(71) Applicant: HONDA MOTOR CO., LTD., Tokyo (JP)

(72) Inventors: Andrew K. Swayne, Raymond, OH (US); Ryan M. Hahnlen, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 117 days.

(21) Appl. No.: 16/548,400

(22) Filed: Aug. 22, 2019

(65) Prior Publication Data
US 2020/0010121 A1    Jan. 9, 2020

Related U.S. Application Data

(63) Continuation of application No. 15/706,134, filed on Sep. 15, 2017, now Pat. No. 10,421,496.

(51) Int. Cl.
    *B62D 25/06*    (2006.01)
    *B62D 27/02*    (2006.01)
    *B62D 29/00*    (2006.01)

(52) U.S. Cl.
    CPC ............ *B62D 25/06* (2013.01); *B62D 27/02* (2013.01); *B62D 27/023* (2013.01); *B62D 29/001* (2013.01)

(58) Field of Classification Search
    CPC ...... D62D 25/06; D62D 27/02; D62D 27/023; D62D 29/001; B62D 25/06; B62D 27/02; B62D 27/023; B62D 29/001
    See application file for complete search history.

(56) References Cited

U.S. PATENT DOCUMENTS

| 4,608,931 A | 9/1986 | Ruhmann et al. |
| 4,961,990 A | 10/1990 | Yamada et al. |

(Continued)

FOREIGN PATENT DOCUMENTS

| CN | 106184043 A | 12/2016 |
| DE | 10 2004 054 159 A1 | 5/2006 |

OTHER PUBLICATIONS

Ballet et al., "Ultrasonic spot welding of aluminum sheet/ carbon fiber reinforced polymer—joints" Mat.-wiss. u Werkstofftech. 2007, 38, No. 11., pp. 934-938

(Continued)

*Primary Examiner* — Lori L Lyjak
(74) *Attorney, Agent, or Firm* — Arent Fox LLP

(57) ABSTRACT

A vehicle roof stiffener includes a metal or metal alloy frame defining a central opening and at least one corner. The vehicle roof stiffener also includes a fiber reinforced polymer (FRP) portion including at least one transition structure comprising a metal or a metal alloy. At least some of the fibers of the FRP portion are embedded in the transition structure. The FRP portion is located in the at least one corner. In some examples, the frame includes an opening in the at least one corner, and the FRP portion spans the opening. In other examples, the FRP portion overlaps the frame at the at least one corner. The FRP portion located at the corner may improve rigidity of the roof stiffener to increase resistance to a racking motion and increase the overall stiffness of the vehicle.

20 Claims, 7 Drawing Sheets

(56) References Cited

U.S. PATENT DOCUMENTS

| | | | |
|---|---|---|---|
| 6,519,500 B1 | 2/2003 | White | |
| 7,828,373 B2 | 11/2010 | Fernholz et al. | |
| 7,942,475 B2 | 5/2011 | Murray | |
| 8,114,239 B2 | 2/2012 | Fernholz et al. | |
| 8,783,763 B1 | 7/2014 | Bach | |
| 2007/0040702 A1 | 2/2007 | Mosher et al. | |
| 2009/0242552 A1* | 10/2009 | Myers | B65D 88/127 220/4.33 |
| 2010/0231007 A1 | 9/2010 | Freeman et al. | |
| 2013/0087656 A1 | 4/2013 | Hoetzeldt | |
| 2013/0269265 A1 | 10/2013 | Vande Sande | |
| 2014/0193192 A1* | 7/2014 | Eipper | B29C 70/845 403/270 |
| 2015/0353140 A1 | 12/2015 | Bendiks et al. | |
| 2017/0327155 A1* | 11/2017 | Boettcher | B62D 21/157 |
| 2018/0037151 A1* | 2/2018 | Bauer | B62D 65/02 |
| 2018/0297644 A1 | 10/2018 | Rompage et al. | |
| 2018/0346034 A1 | 12/2018 | Sheldon et al. | |

OTHER PUBLICATIONS

Lionetto et al., "Hybrid ultrasonic spot welding of aluminum to carbon fiber reinforced epoxy composites", Journal of Materials Processing Tech. 247, 2017, pp. 289-295.

\* cited by examiner

PANORAMIC ROOF STIFFENER REINFORCEMENT

CROSS-REFERENCE TO RELATED APPLICATIONS

This application is a continuation of U.S. application Ser. No. 15/706,134 titled "PANORAMIC ROOF STIFFENER REINFORCEMENT," filed Sep. 15, 2017, which is assigned to the assignee hereof, and incorporated herein by reference in its entirety.

BACKGROUND

Traditional vehicle roofs include a metal stiffener component. The metal stiffener component provides structural support to a relatively thin roof panel and helps the vehicle maintain its shape. The metal stiffener component, however, adds significant weight to the vehicle above a center of gravity of the vehicle. Therefore, the heavy weight of the metal stiffener component decreases the amount of light-weighting that can occur below the roof without raising the center of gravity of the vehicle.

In view of the foregoing, there is a need for improved vehicle roof stiffeners. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the disclosure provides a vehicle roof stiffener. The vehicle roof stiffener may include a metal or metal alloy frame defining a central opening and at least one corner. The vehicle roof stiffener may include a fiber reinforced polymer (FRP) portion including at least one transition structure comprising a metal or a metal alloy. At least some of the fibers of the FRP portion are embedded in the transition structure. The FRP portion is located in the at least one corner.

In another aspect, the disclosure provides a method of manufacturing a vehicle roof. The method may include providing a metal or metal alloy frame defining a central opening and at least one corner. The method may include providing at least one fiber reinforced polymer (FRP) portion of a roof stiffener including at least one metal tab having fiber tows embedded therein. The method may include joining the FRP portion to the metal frame via the at least one metal tab.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "vehicle," as used herein, refers to any manned or unmanned structure capable of moving and is powered by any form of energy. The term "vehicle" includes, but is not limited to: cars, trucks, vans, minivans, SUVs, motorcycles, scooters, boats, personal watercraft, submersibles, aircraft, and spacecraft. In some cases, a motor vehicle includes one or more engines.

It should be understood that the description and drawings herein are merely illustrative and that various modifications and changes can be made in the structures disclosed without departing from the present disclosure. In general, the figures of the example vehicle roof structure are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the example vehicle roof structure disclosed herein are merely terms of art that may vary from one manufacturer to another and should not be deemed to limit the present disclosure.

Generally described, the present disclosure provides for a vehicle roof stiffener including a metal or metal alloy frame and one or more FRP portions located at the corners. The at least one FRP portion may be joined to the frame by a metal or metal alloy transition structure including fiber embedded therein. The transition structure may be in the shape of an insert or tab. Although the transition structure is described herein as being a tab, the transition structure is not limited to any shape or geometry. The fiber may extend from the metallic tab. The FRP portion may include multiple layers of FRP with the fiber of the transition structure interleaved with the layers of FRP. Accordingly, the transition structure may form a permanent integrated feature of the FRP portion. The transition structure, because it is metal, may be welded to the metallic frame, e.g., via resistance spot welding. Accordingly, a strong permanent attachment between the metallic frame and the FRP portion may provide structural rigidity to the roof stiffener. In an aspect, the FRP portion may include carbon fibers. Other fibers that could be used include glass fibers, aramid fibers, polyparaphenylene-benzobisethiazole (PBO) fibers, ceramic fibers such as SiC, and any combinations thereof.

Figure 2:
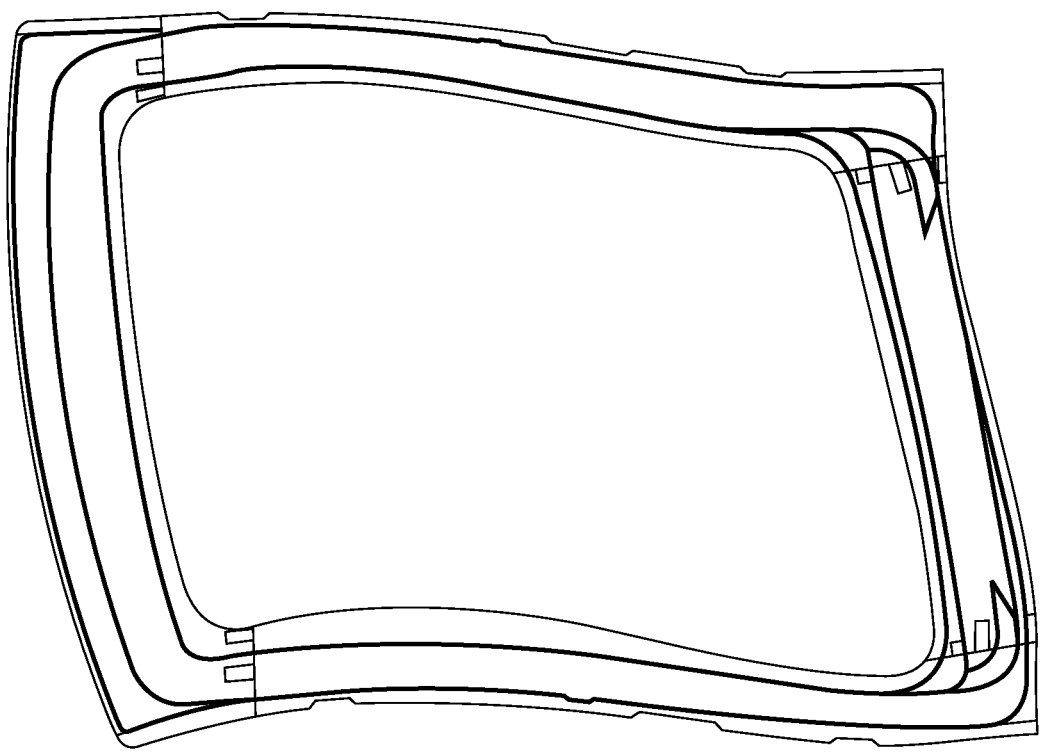
FIG. 2 is top view of a roof stiffener subject to a racking motion.

The metal or metal alloy frame may be an aluminum or aluminum alloy frame. Although lighter than other metals, an aluminum frame may be susceptible to a racking motion. The FRP portion may provide reinforcement against the racking motion. Because both aluminum and FRP are lighter than traditional steel used in roof stiffeners, the use of an aluminum frame with FRP portion for reinforcement may reduce the weight of the roof stiffener. The use of integrated transition structures including fiber embedded within a metallic tab may allow use of metal to metal joining techniques that do not damage the FRP portion. Accordingly, an FRP portion may be included in a roof stiffener without compromising structural integrity. Additionally, the FRP portion may be more resistant to a racking motion (e.g., collapsing and opening at opposing corners) than metal roof stiffeners, contributing to an increase in body rigidity. An example of a roof stiffener 130 experiencing a racking motion is illustrated in FIG. 2. As illustrated, an angle of one corner may expand while the angle of the adjacent corners may narrow, resulting in a twisted shape of the roof stiffener 130. The resistance of the roof stiffener to a racking motion (rigidity) may affect the stiffness of the vehicle body 104 as a whole.

Figure 1:
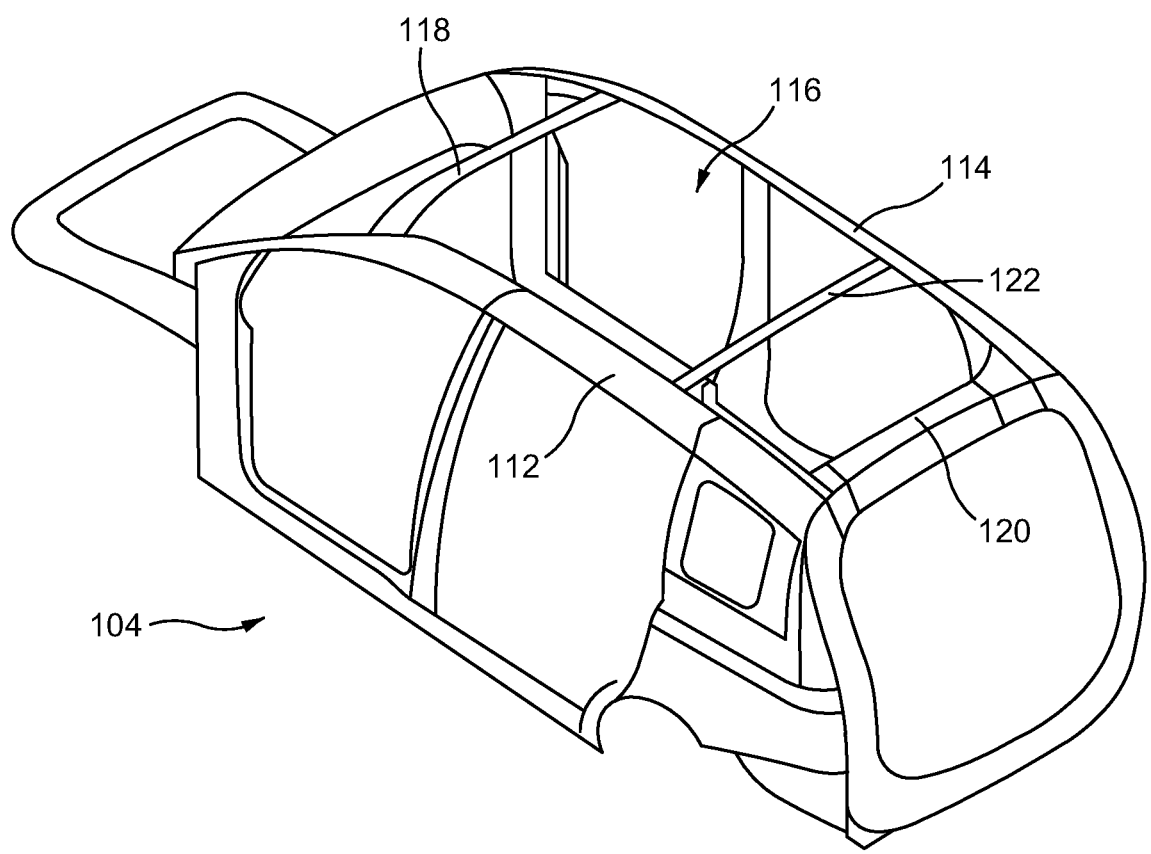
FIG. 1 is a perspective view of a vehicle body.

Turning to the figures, where like reference numbers refer to like components, FIG. 1 illustrates an example vehicle body 104, which may support a metal alloy vehicle roof structure (not shown) attached to the metal alloy vehicle body 104. As schematically shown in FIG. 1, the vehicle body 104 includes a pair of laterally spaced body members 112, 114 for defining sides of a passenger compartment 116 and a front roof rail 118 and a rear roof rail 120 spanning between the body members. A cross member or roof bow 122 interposed between the front and rear roof rails 118, 120 extends between the spaced body members 112, 114. The body members together with the front and rear roof rails 118, 120 support the vehicle roof structure over the passenger compartment 116. The spaced body members 112, 114 partially define a door frame.

Figure 3A:
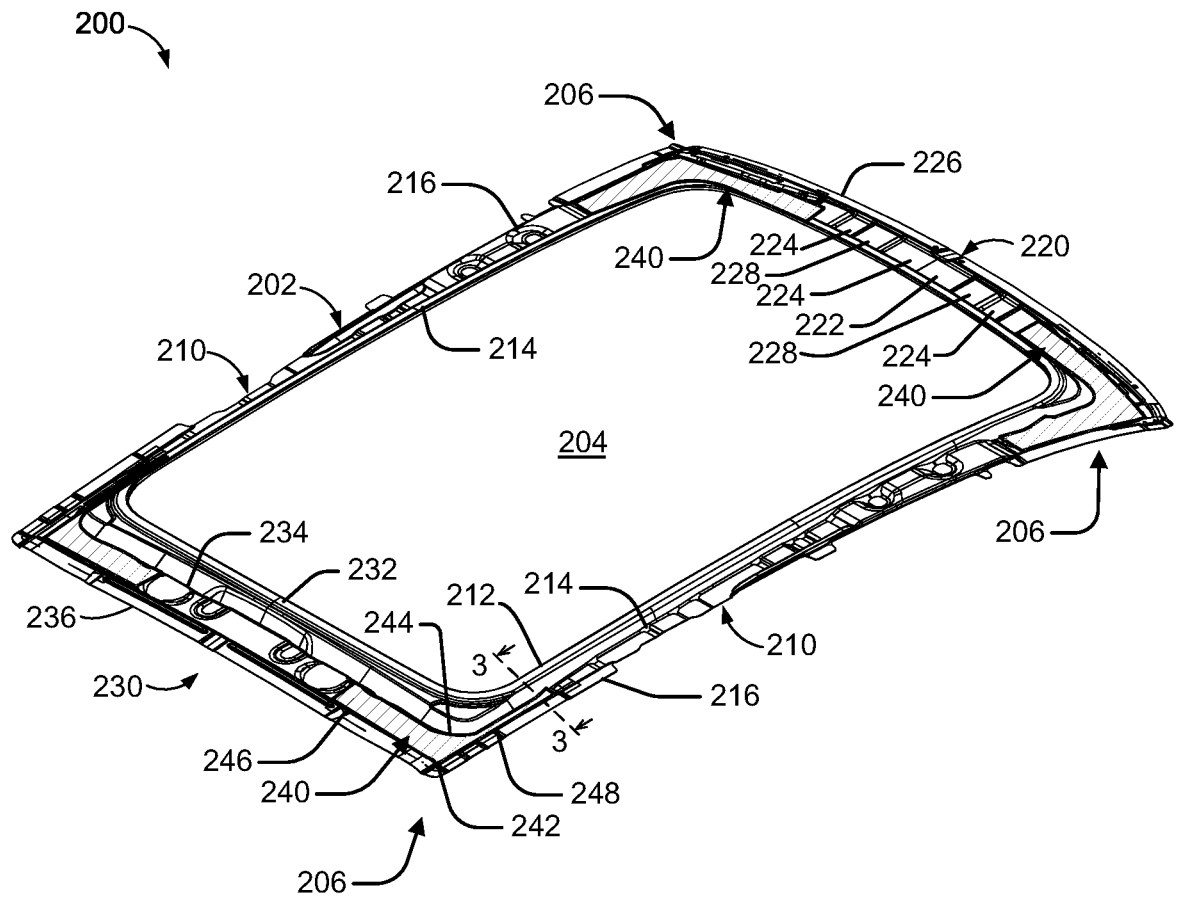
FIG. 3A is a perspective view of an example roof stiffener with reinforcement portions within an opening in a channel portion of a frame.
Figure 3B:
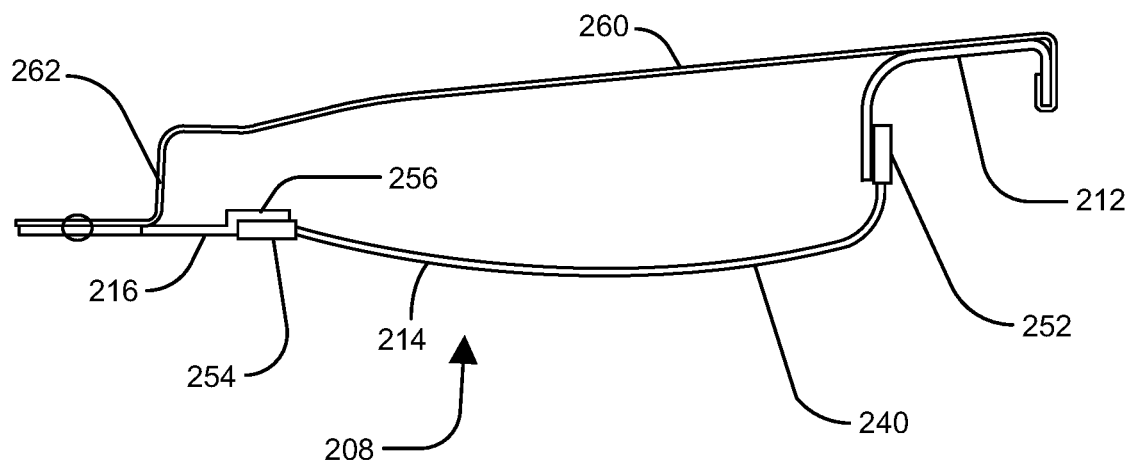
FIG. 3B is a cross-sectional view of the roof stiffener of FIG. 3A through the frame and a reinforcement portion.

FIG. 3A illustrates a perspective view of an example vehicle roof stiffener 200. FIG. 3B illustrates a cross-section of the roof stiffener 200 along the line 3-3 of FIG. 3A. The vehicle roof stiffener 200 may include a frame 202 defining a central opening 204. For example, the frame may be generally trapezoidal or rectangular and may define the central opening 204. The frame 202 may be a metal or metal alloy. The roof stiffener 200 may be mounted to a vehicle body 104 to provide support for a roof panel. The roof stiffener 200 may also support a glass assembly such as a panoramic roof, sun roof, or moon roof within the central opening 204. The frame 202 may include longitudinal side portions 210 that each form a side of the vehicle roof stiffener 200 and extend substantially parallel to a longitudinal vehicle axis. That is, the side portion 210 may extend along a side of the vehicle from front to back. The frame 202 may also include a front portion 220. The front portion 220 may extend transverse to the longitudinal vehicle axis at a front of the vehicle roof. The frame 202 may also include a rear portion 230 that may extend transverse to the longitudinal vehicle axis as a rear structural support for the roof. The side portions 210, front portion 220, and rear portion 230 may be integrally formed, for example, by a stamping or forging process.

Each side portion 210 may be a generally elongated frame member having a generally channel-like structure. For example, the side portion 210 may include an inner lip 212, a recessed central channel portion 214, and an outer lip 216. The channel-like structure of the side portions 210 may provide structural rigidity to help stiffen a roof assembly. The side portion 210 may be formed using conventional metal processes such as stamping a metal sheet. The side portion 210 may be formed of any metal or combination of metals compatible with the techniques disclosed herein. For example, the side portion 210 may be formed of steel, aluminum, magnesium, titanium, cobalt, beryllium, nickel, columbium, tantalum, tungsten, and alloys thereof, or other structural alloys.

The front portion 220 may also be a generally elongate frame member having a generally channel-like structure. For example, the front portion 220 may include an inner lip 222, a recessed central channel portion 224, and an outer lip 226. In the illustrated example, the front portion 220 may also include raised areas 228 with no recessed central channel portion 224. The channel-like structure of the front portion 220 may provide structural rigidity to help stiffen a roof assembly. The raised areas 228 may provide mounting areas for contacting a roof panel (not shown).

The rear portion 230 may also be a generally elongate frame member having a generally channel-like structure similar to the front portion 220. For example, the rear portion 230 may include an inner lip 232, a recessed central channel portion 234, and an outer lip 236. The outer lip 236 may be an elongated lip that extends along an entire side of the rear portion 230. As discussed in further detail below, the outer lip 236 may be welded to a vehicle frame member.

Two front corners 206 may be defined by the intersection of the respective side portions 210 and the front portion 220. Two rear corners 206 may be defined by the intersection of the respective side portions 210 and the rear portion 230. The recessed central channel portions 214, 224, 234 may be connected at the corners 206. As discussed above, the roof stiffener 200 may experience a racking motion characterized by bending at the corners 206. The corners 206 may be provided with an FRP reinforcement portion 240 that resists the racking motion. The FRP reinforcement portions 240 may generally be L-shaped. That is, the FRP reinforcement portions 240 may be formed by an intersecting longitudinal leg 248 and transverse leg 246. The longitudinal leg 248 and the transverse leg 246 may intersect at a substantially right angle. The FRP reinforcement portions 240 may include an outer corner 242 and inner corner 244. As discussed in further detail below, the FRP reinforcement portions 240 may be attached to the frame 202 in various configurations. For example, the FRP reinforcement portion 240 may be fitted within an opening in the corner of the frame 202 or the FRP reinforcement portion 240 may overlap a portion of the frame 202 at the corner 206. The FRP reinforcement portion 240 may be attached to the frame 202 using a transition structures 252, 254, which may be integrated into the FRP reinforcement portion 240.

In an aspect, the transition structures described herein (e.g., transition structures 252, 254) may include fiber tows embedded within a metal tab using ultrasonic additive manufacturing (UAM). UAM techniques for embedding fibers are described in, for example, Hahnlen and Dapino, "Active Metal-matrix Composites with Embedded Smart Materials by Ultrasonic Additive Manufacturing," Proceedings of SPIE—The International Society for Optical Engineering 7645:15, March 2010, which is incorporated herein by reference. The metal tab may be formed of any metal compatible with the techniques disclosed therein. For example, the metal tab may be formed of steel, aluminum, magnesium, titanium, cobalt, beryllium, nickel, columbium, tantalum, tungsten, and alloys thereof, or other structural alloys. The fiber tows may extend out from edges of the metal tab. The transition structure may be embedded within the FRP reinforcement portion 240 during manufacture of the FRP reinforcement portion 240. For example, the fiber tows may be interleaved with fiber fabric forming the FRP reinforcement portion 240, prior to consolidating the FRP. Accordingly, the metal tabs may form an integrated portion of the FRP reinforcement portion 240. The surface of the metal tabs may be exposed. In some aspects, one or more edges of the metal tabs may form an edge of the FRP reinforcement portion 240.

In the example illustrated in FIGS. 3A and 3B, the frame 202 may include an opening 208 into which the FRP reinforcement portion 240 is mounted. For example, the opening may be within the channel portion 214, 224, 234. The FRP reinforcement portion 240 may include a transition structure 252 that is attached to a vertical wall of the channel portion 214 near the inner lip 212. The FRP reinforcement portion 240 may also include a transition structure 254 that is attached to the bottom of the channel portion 214. In an implementation, the frame 202 may include an offset flange 256 along the opening 208. The offset flange 256 may provide a mounting location for the transition structure 254. The offset may allow a surface of the transition structure 254 to be level with a surface of the frame 202. For example, as illustrated, the offset flange 256 may allow a bottom surface of the transition structure 254 to be level with a bottom surface of the channel portion 214.

A roof skin 260 may be attached to the vehicle roof stiffener 200. For example, the roof skin 260 may be hemmed to the inner lip 212 by bending the roof skin 260 around the inner lip 212. As another example, the roof skin 260 may be resistance spot welded to the frame 202. The roof skin 260 may include a joggle that maintains a smooth surface for sealing against a seal of a sunroof placed in the opening 204. The transition structure 252 may be attached to the frame 202 such that the transition structure 252 does not interfere with the hem. The roof skin 260 may also include a channel 262 (e.g., for collecting rainwater). The roof skin may be resistance spot welded to the frame 200 at the bottom of the channel 262. The channel 262 may be located external to the transition structure 254 such that the transition structure 254 does not interfere with the channel 262 and the channel 262 can be welded directly to the frame 200 at the outer lip 216.

Figure 4A:
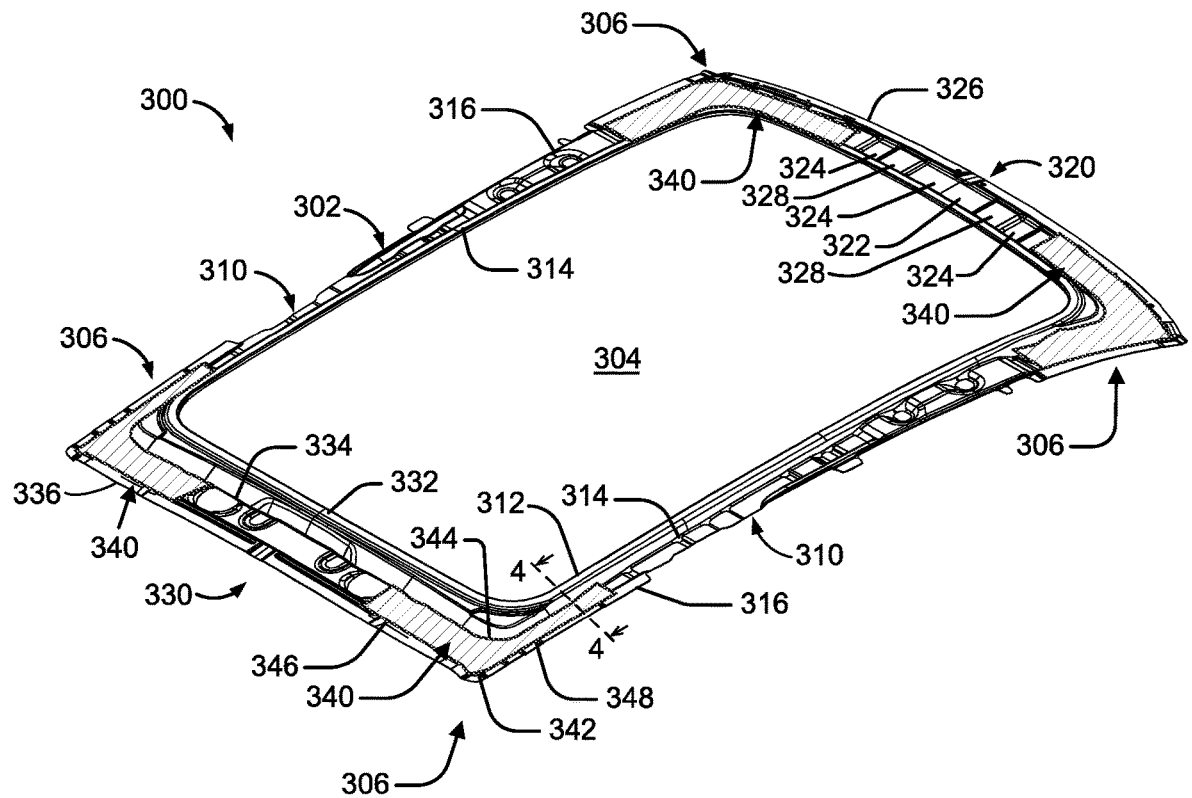
FIG. 4A is a perspective view of another example roof stiffener with reinforcement portions within an opening at the corner of a frame.
Figure 4B:
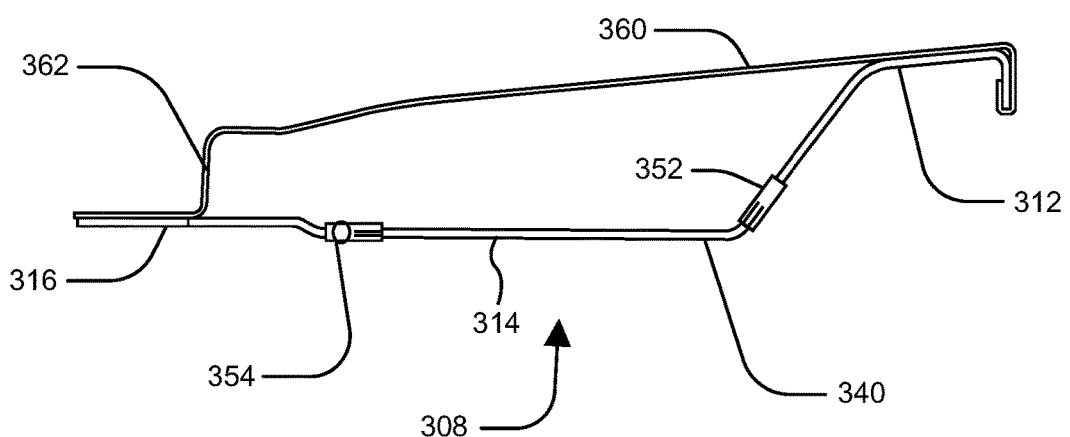
FIG. 4B is a cross-sectional view of the roof stiffener of FIG. 4A through the frame and a reinforcement portion.

FIGS. 4A and 4B illustrate another example roof stiffener 300, with FIG. 4B being a cross-sectional view along the line 4-4 of FIG. 4A. The roof stiffener 300 may be similar in some aspects to the roof stiffener 200. The roof stiffener 300 may include a frame 302 defining a central opening 304, side portions 310, a front portion 320, and rear portion 330 including inner lips 312, 322, 332, channel portions 314, 324, 334, outer lips 316, 326, 336, and raised portions 328 similar to the corresponding features of the roof stiffener 200. The corners 306 may include a differently shaped opening 308. The opening 308 may be defined, in part, by flanges 352, 354 extending from the inner lip 312. An FRP reinforcement portion 340 may be located within the opening 308. In an aspect, the FRP reinforcement portion 340 may include fiber tows embedded within the flanges 352, 354. For example, the flanges 352, 354 may be formed as a continuous tab of a transition structure using a UAM process. The flange 352 may then be butt welded to the inner lip 312 to produce a smooth transition between the frame 302 and the FRP reinforcement portion 340 without an offset or overlap. Similarly, the flange 354 may be butt welded to the outer lip 316.

The FRP reinforcement portion 340 may also be generally L-shaped and include external corner 342, internal corner 344, transverse leg 346, and longitudinal leg 348. The flanges 352, 354 may be substantially the same thickness as the frame 302 and the FRP reinforcement portion 340 to provide a smooth transition between the FRP reinforcement portion 340 and a surface of the frame 302. As illustrated, the FRP reinforcement portion 340 may include a bend having an angle, which may be selected according to a design for a specific vehicle, for example, to match a profile of an all metal roof stiffener.

Figure 5A:
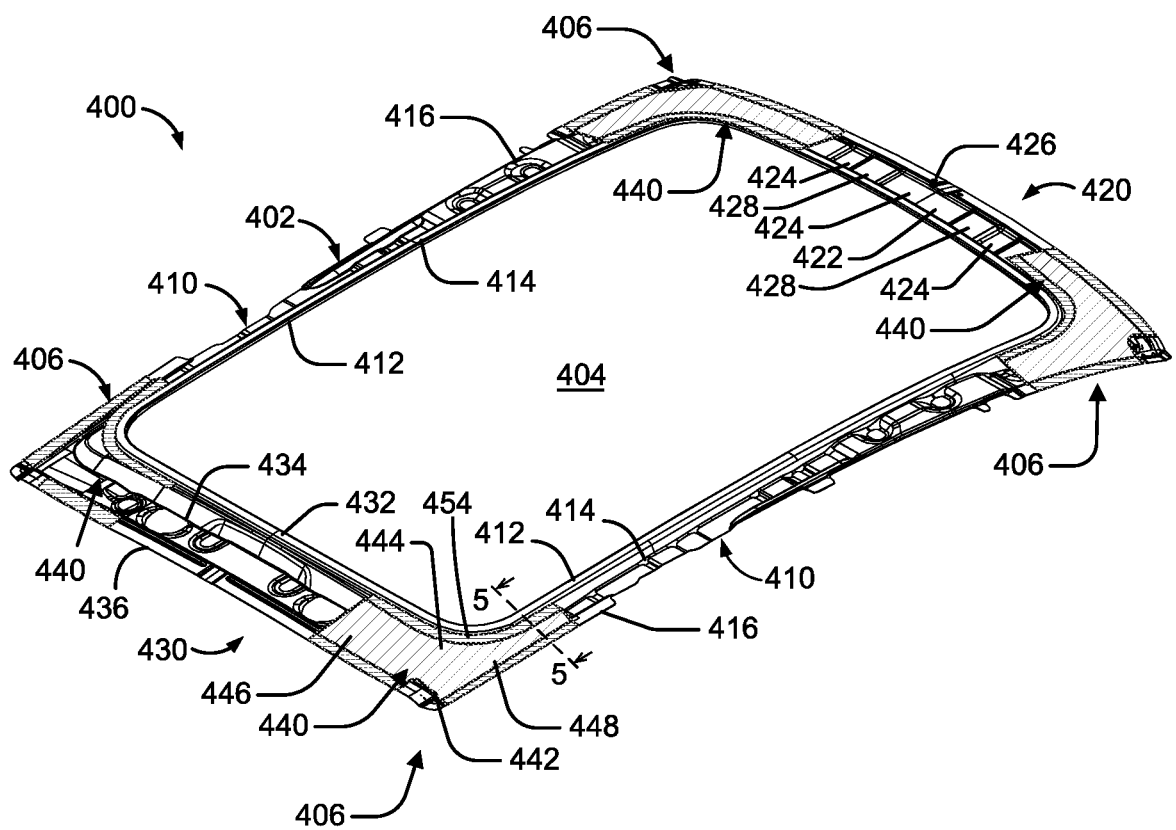
FIG. 5A is a perspective view of a roof stiffener with reinforcement portions overlapping a frame.
Figure 5B:
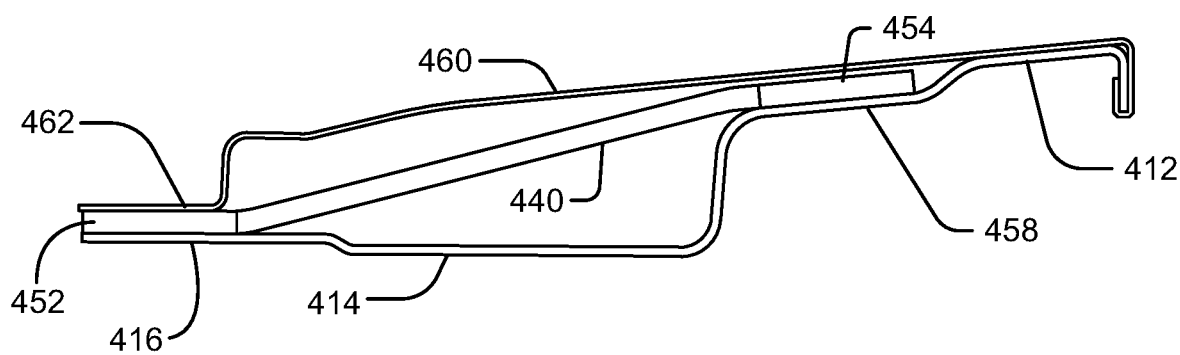
FIG. 5B is a cross-sectional view of the roof stiffener of FIG. 5A through the frame and a reinforcement portion.

FIGS. 5A and 5B illustrate another example roof stiffener 400, with FIG. 5B being a cross-sectional view along the line 5-5 of FIG. 5A. The roof stiffener 400 may be similar in some aspects to the roof stiffener 200. The roof stiffener 400 may include a frame 402 defining a central opening 404, side portions 410, a front portion 420, and rear portion 430 including inner lips 412, 422, 432, channel portions 414, 424, 434 outer lips 416, 426, 436, and raised portions 428 similar to the corresponding features of the roof stiffener 200. In an aspect, the inner lip 412 may be extended by a recessed flange 458. The corners 406 may not include an opening. Instead, the FRP reinforcement portion 440 may be mounted to the frame 402 in an overlapping manner.

As illustrated, the FRP reinforcement portion 440 may also be generally L-shaped and include external corner 442, internal corner 444, transverse leg 446, and longitudinal leg 448, similar to FRP reinforcement portion 340. The FRP reinforcement portion 440 may also include transition structures 452 and 454, which are attached to the outer lip 416 and the inner lip 412 respectively. For example, the transition structures 452 and 454 may form edges of the reinforcement portion 440 and may be welded to the outer lip 416 and the inner lip 412 using periodic spot welds. The transition structure 454 may be welded to the inner lip 412 at the flange 458. The transition structure 452 may be mounted to a top surface of the outer lip 416.

A roof skin 460 may be mounted to the roof stiffener 400. For example, the roof skin 460 may be hemmed to the inner lip 412. The roof skin 460 may include a channel 462, which may be attached to the transition structure 452, for example by welding or hemming.

As illustrated in FIG. 5B, the FRP reinforcement portion 440 may extend in a straight line from the inner lip 412 to the outer lip 416. The channel portion 414 may extend below the FRP reinforcement portion 440. The positioning of the FRP reinforcement portion 440 may prevent distortion of the shape of the channel portion 414 and thereby resist a racking motion of the roof stiffener 400.

Figure 6A:
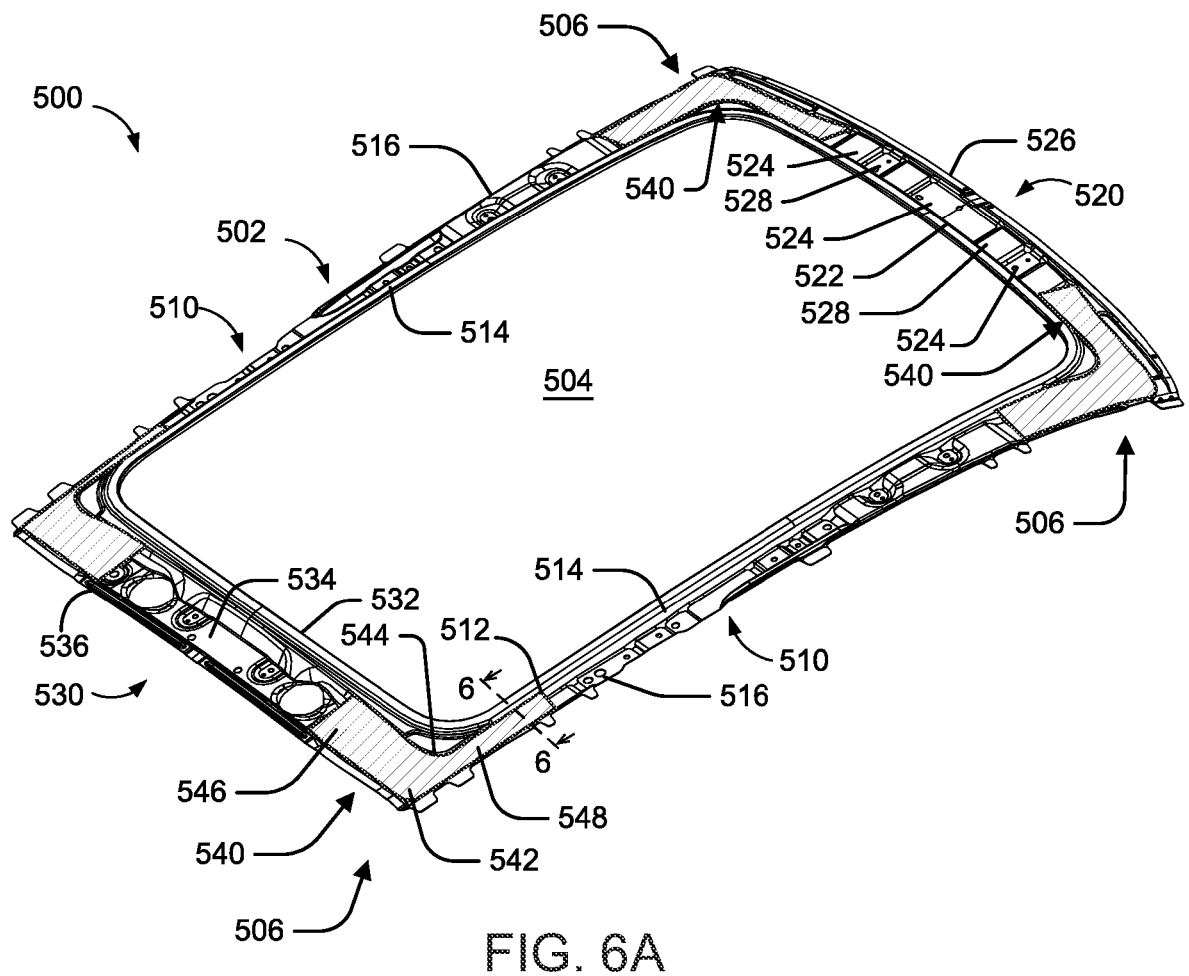
FIG. 6A is a perspective view of a roof stiffener with reinforcement portions rigidly connected within a channel portion of a frame.
Figure 6B:
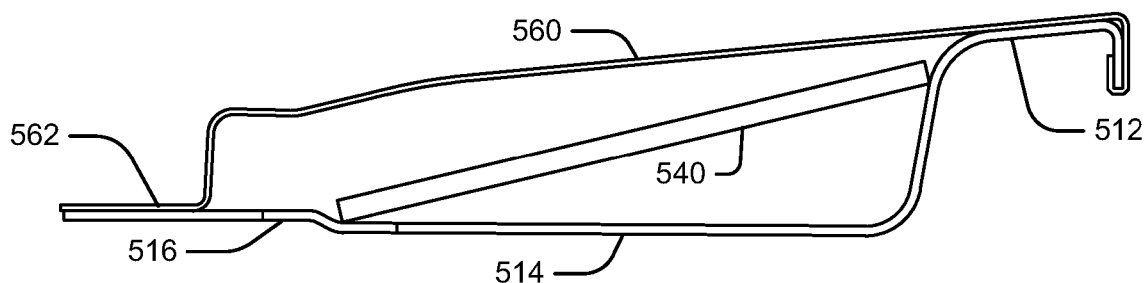
FIG. 6B is a cross-sectional view of the roof stiffener of FIG. 3A through the frame and a reinforcement portion.

FIGS. 6A and 6B illustrate another example roof stiffener 500, with FIG. 6B being a cross-sectional view along the line 6-6 of FIG. 6A. The roof stiffener 500 may be similar in some aspects to the roof stiffener 200. The roof stiffener 500 may include a frame 502 defining a central opening 504, side portions 510, a front portion 520, and rear portion 530 including inner lips 512, 522, 532, channel portions 514, 524, 534, outer lips 516, 526, 536, and raised portions 528 similar to the corresponding features of the roof stiffener 200. In an aspect, the corners 506 may not include an opening. Instead, the FRP reinforcement portion 540 may be mounted to the frame 502 in an overlapping manner similar to the roof stiffener 400. The FRP reinforcement portion 540 may also be generally L-shaped and include external corner 542, internal corner 544, transverse leg 546, and longitudinal leg 548. However, the inner lip 512 may not include a flange similar to the flange 458 of the roof stiffener 400. Instead, the FRP reinforcement portion 540 may be rigidly connected to internal surfaces of the channel portion 514 As illustrated, for example, the FRP reinforcement portion 540 may have a straight cross-section. The FRP reinforcement portion 540 may not include transition structures. The FRP reinforcement portion 540 may be attached to the surface of the channel portion 514 using an adhesive. In another aspect, one or more edges of the FRP reinforcement portion 540 may include a transition structure, which may be welded to the surface of the channel portion 514. In an aspect, the FRP reinforcement portion 540 may be attached to the channel portion 514 at a location where the channel portion 514 curves downward from the inner lip 512 and/or the outer lip 516. The FRP reinforcement portion 540 may alternatively be attached to the inner lip 512 and or the outer lip 516.

The above examples refer to a cross section across the side portion 210, 310, 410, 510 through a longitudinal leg 248, 348, 448, 548 of the respective roof stiffeners 200, 300, 400, 500. It should be appreciated that the FRP reinforcement portions 240, 340, 440, 540 may be attached at the front portions 220, 320, 420, 520 and the rear portions 230, 330, 430, 530 in a similar manner. Moreover, the different example FRP reinforcement portions may be selected for different corners. For example, the front corners may use the FRP reinforcement portion 540 and the rear corners may use the FRP reinforcement portion 240.

Figure 7:
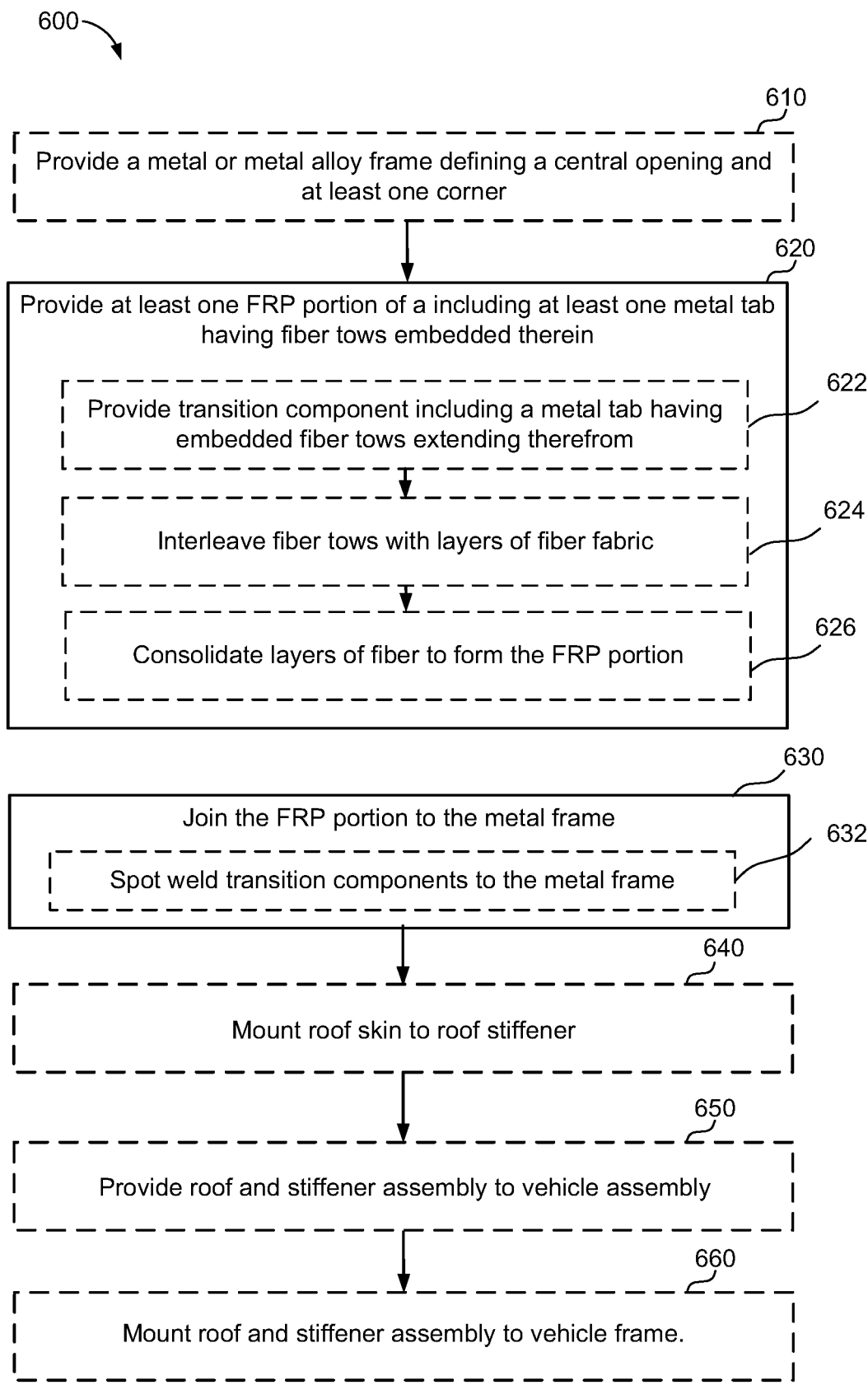
FIG. 7 is a flowchart illustrating an example method of manufacturing a vehicle roof, according to an aspect of the disclosure.

FIG. 7 is a flowchart illustrating an example method 600 of manufacturing a vehicle roof. The vehicle roof may include a roof stiffener 200, 300, 400, 500. The method 600 may be performed by an operator using equipment including an ultrasonic welding machine and other manufacturing tools and apparatuses known in the art. Although the method 600 is described below with respect to actions performed by an operator, one or more of the steps described herein may be automated (e.g., performed by a robotic arm).

In block 610, the method 600 may include providing a metal or metal alloy frame defining a central opening and at least one corner. In an aspect for example, the frame 202, 302, 402, 502 defining the central opening 204, 304, 404, 504 and at least one corner 206, 306, 406, 506 may be provided.

In block 620, the method 600 may include providing at least on FRP portion including fiber embedded in a metal tab. In an aspect for example, one or more of the FRP reinforcement portions 240, 340, 440, 540 may be provided. Providing the at least one FRP portion may include manufacturing the at least one FRP portion as illustrated in blocks 622, 624, 626.

In block 622, block 620 may include providing a transition component including a metal tabs having the embedded fiber tows extending therefrom. As discussed above, the plurality of transition component may be manufactured using UAM to embed fiber tows within a metal tab. The fiber tows may extend from the sides of the metal tab that are to contact the FRP portion. The fiber tows may also be woven to form a fabric, or tows of a fabric may be embedded within the metal tab.

In block 624, block 620 may include interleaving the fiber tows with layers of fiber fabric. In an aspect, for example, the layers of fiber fabric may be carbon-fiber fabric cut to the shape of the FRP reinforcement portion 240, 340, 440, 540. The layers may include a cutout in the location of the transition structures. The metal tabs of the transition components may be placed in the cutouts with the fiber tows extending over a layer of carbon-fiber fabric. Another layer of carbon-fiber fabric may then be placed over the fiber tows. Multiple layers may be interleaved to integrate the transition component with the fiber layers.

In block 626, block 620 may include consolidating the layers of fiber fabric to form the FRP portion. In an aspect, for example, the consolidating may include any process for binding fiber layers used to manufacture FRP components. For example, consolidating may include infusing the fiber layers with resin and curing the resin using an autoclave or hot-press mold. The FRP component formed may be, for example, the FRP reinforcement portion 240, 340, 440, 540.

In block 630, the method 600 may include joining the FRP portion to the metal frame. For example, an the FRP reinforcement portion 240, 340, 440, 540 may be joined to each of one or more corners 206, 306, 406, 506 of the frame 202, 302, 402, 502. In block 632, block 630 may include spot welding the transition components to the metal portion. For example, the transition structures 252, 254, 352, 354, 452, 454 may be spot welded to the frame 202, 302, 402, 502.

In block 640, the method 600 may optionally include mounting a roof panel to the roof stiffener creating a roof skin composition. In an aspect, for example, the roof skin 260, 360, 460, 560 may be hemmed to the roof stiffener 200, 300, 400, 500 at the inner lips 212, 312, 412, 512. Additionally, the roof skin 260, 360, 460, 560 may be spot welded to the outer lips 216, 316, 416, 516. The rear outer lip 236, 336, 436, 536 may be attached to the roof skin 260, 260, 360, 460 via a soft mastic. The combination of the roof skin and the roof stiffener may be referred to as a roof skin composition or roof comp.

In block 650, the method 600 may optionally include providing the roof stiffener and roof skin composition to a vehicle assembly facility. In an aspect, for example, one or more of the roof stiffeners 200, 300, 400, 500 or the roof skin composition may be provided to a vehicle assembly facility. The roof stiffeners 200, 300, 400, 500 may be compatible with existing vehicle assembly lines. Accordingly, the roof stiffeners 200, 300, 400, 500 may be mounted to the vehicle using traditional tools and techniques such as but not limited to spot welding and adhesives.

In block 660, the method 600 may optionally include mounting the roof stiffener and roof skin composition on a vehicle frame. In an aspect, for example, the roof stiffener 200, 300, 400, 500, which may be joined to the roof skin 260, 360, 460, 560, may be mounted to the vehicle body 104. In an implementation, the roof stiffener 200, 300, 400, 500, which may be joined to the roof skin 260, 360, 460, 560, may be attached to the vehicle body 104 using spot welds along the outer lips 216, 316, 416, 516 and/or the roof skin channel 262, 362, 462, 562.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A stiffener, comprising:
   a metal or metal alloy frame defining a central opening and at least one corner; and
   a fiber reinforced polymer (FRP) portion attached to the metal or metal alloy frame in the at least one corner.

2. The stiffener of claim 1, wherein the metal or metal alloy frame includes at least one opening within the at least one corner, the FRP portion filling the opening.

3. The stiffener of claim 2, wherein the metal or metal alloy frame includes an offset flange forming an edge of the at least one opening, wherein the FRP portion is attached to the offset flange.

4. The stiffener of claim 1, wherein the FRP portion overlaps the metal or metal alloy frame at the at least one corner.

5. The stiffener of claim 4, wherein the FRP portion extends from an outer lip of the frame, across a central channel, to an inner lip of the frame.

6. The stiffener of claim 1, wherein the FRP portion is L-shaped.

7. The stiffener of claim 1, wherein the FRP portion includes a first portion substantially parallel to a longitudinal axis of the metal or metal alloy frame and a second portion substantially perpendicular to the longitudinal axis of the vehicle.

8. The stiffener of claim 7, wherein the first portion and the second portion form an internal corner and an external corner.

9. The stiffener of claim 1, wherein the metal or metal alloy frame includes an outer lip, a recessed central channel portion, and an inner lip.

10. The stiffener of claim 9, wherein the FRP portion extends from the inner lip to a bottom of the central channel portion.

11. The stiffener of claim 9, wherein the FRP portion extends within the central channel portion.

12. The stiffener of claim 9, further comprising a skin hemmed to the inner lip, wherein the skin comprises aluminum or an alloy thereof and the metal or metal alloy frame comprises aluminum or an alloy thereof.

13. The stiffener of claim 1, wherein an interface, between the metal or metal alloy frame and the at least one FRP portion, includes an offset flange in the metal or metal alloy frame, wherein the at least one FRP portion fills at least a portion of the offset.

14. The stiffener of claim 1, wherein the FRP portion is attached to a surface of the metal frame using an adhesive.

15. The stiffener of claim 1, further comprising a body attached to the metal or metal alloy frame, wherein the body is a metal alloy.

16. A method of manufacturing a stiffener, comprising:
    providing a metal or metal alloy frame defining a central opening and at least one corner;
    providing at least one fiber reinforced polymer (FRP) portion; and
    joining the FRP portion to the metal or metal alloy frame.

17. The method of claim 16, further comprising mounting a skin to the stiffener creating a skin composition by hemming the skin to an internal edge of the frame that defines the central opening.

18. The method of claim 17, further comprising mounting the skin composition on a body by joining the metal or metal alloy frame to the body.

19. The method of claim 16, wherein providing the at least one FRP portion comprises:
    providing a transition component comprising at least one metal tab having fiber tows embedded therein;
    interleaving the embedded fiber tows with layers of fiber fabric; and
    consolidating the layers of fiber fabric to form the FRP portion.

20. The method of claim 16, wherein joining the FRP portion to the metal or metal alloy frame comprises attaching the FRP portion to a surface of the metal frame using an adhesive.

* * * * *